(12) United States Patent
Sanger

(10) Patent No.: US 6,863,360 B2
(45) Date of Patent: Mar. 8, 2005

(54) METHOD FOR ADJUSTING DOT-GAIN FOR A HALFTONE BINARY BITMAP

(75) Inventor: Kurt M. Sanger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/635,256

(22) Filed: Aug. 6, 2003

(65) Prior Publication Data

US 2005/0030329 A1 Feb. 10, 2005

(51) Int. Cl.$^7$ .................. B41J 2/205; H04N 1/405; G06K 9/62
(52) U.S. Cl. .................. 347/15; 358/1.9; 358/3.01; 382/224; 382/260
(58) Field of Search .................. 347/15, 43; 358/1.9, 358/3.01, 3.06, 3.03, 512, 534; 382/252, 224, 260–265

(56) References Cited

U.S. PATENT DOCUMENTS

| | | | |
|---|---|---|---|
| 4,630,125 A | 12/1986 | Roetling | |
| 5,051,844 A | * 9/1991 | Sullivan | .................. 358/3.03 |
| 5,164,742 A | 11/1992 | Baek et al. | |
| 5,208,871 A | 5/1993 | Eschbach | |
| 5,250,934 A | 10/1993 | Denber et al. | |
| 5,255,085 A | 10/1993 | Spence | |
| 5,285,854 A | 2/1994 | Thacker et al. | |
| 5,293,539 A | 3/1994 | Spence | |
| 5,483,351 A | 1/1996 | Mailloux et al. | |
| 5,680,485 A | 10/1997 | Loce et al. | |
| 5,721,625 A | 2/1998 | Furusawa et al. | |
| 5,767,887 A | 6/1998 | Warner et al. | |
| 6,115,140 A | 9/2000 | Bresler et al. | |
| 6,204,874 B1 | 3/2001 | Michelson | |
| 6,347,153 B1 | * 2/2002 | Triplett et al. | .............. 382/224 |
| 6,549,658 B1 | * 4/2003 | Schweid et al. | ............ 382/173 |

OTHER PUBLICATIONS

Graphic technology—Graphic arts reflection densitometry measurements—Terminology, equations, image elements and procedures, 1993, p. 7.

* cited by examiner

Primary Examiner—Lamson Nguyen
(74) Attorney, Agent, or Firm—Nelson Adrian Blish

(57) ABSTRACT

A method for adjusting dot-gain for a halftone binary bitmap file, a method for adjusting the dot-gain for a halftone binary print, and a method for adjusting the dot-gain for a printing plate, wherein each method involves inputting a halftone binary bitmap file consisting of binary pixels to a digital filter, then filtering the binary pixels with the digital filter and generating a weighted sum of the pixels, using the weighted sum, producing a multilevel pixel and then comparing the multilevel pixel to a preset level, next a binary pixel output is generated, the output are collected and an adjusted halftone binary bitmap file is formed.

30 Claims, 16 Drawing Sheets

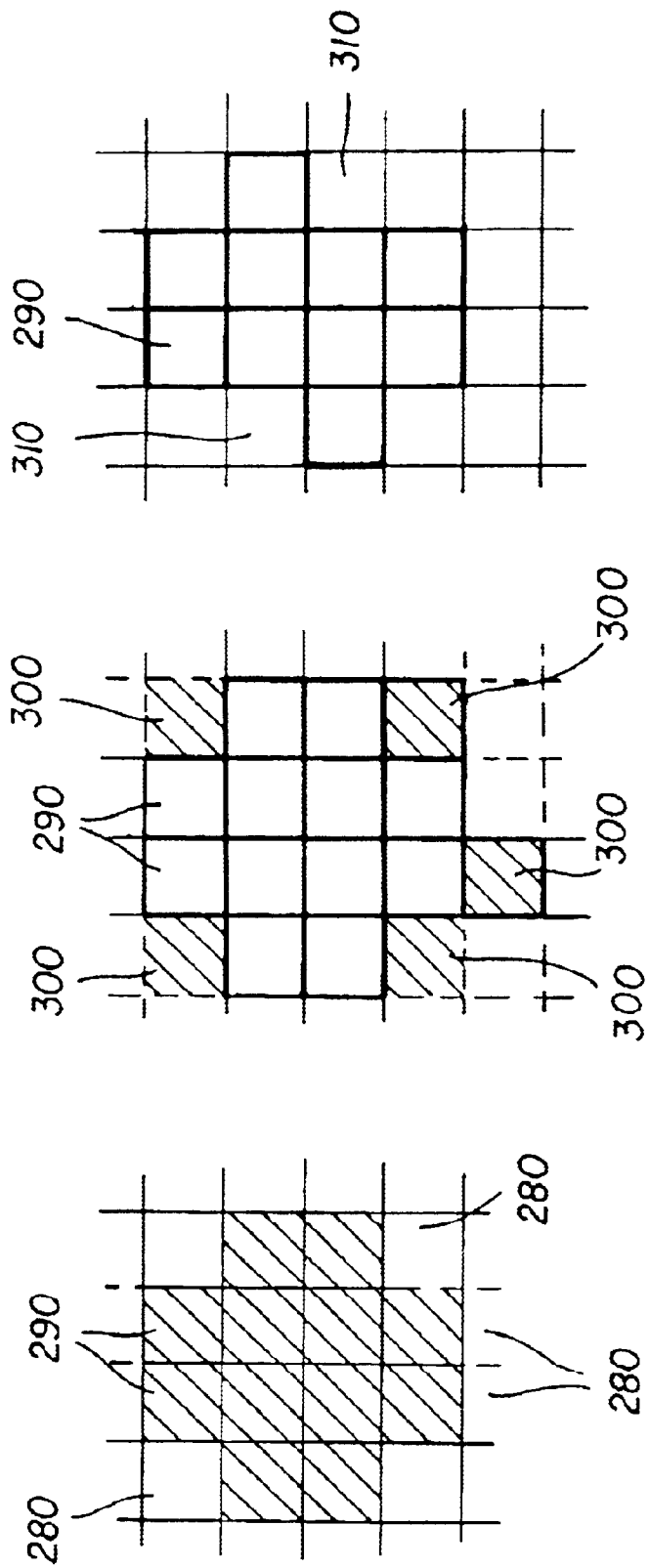

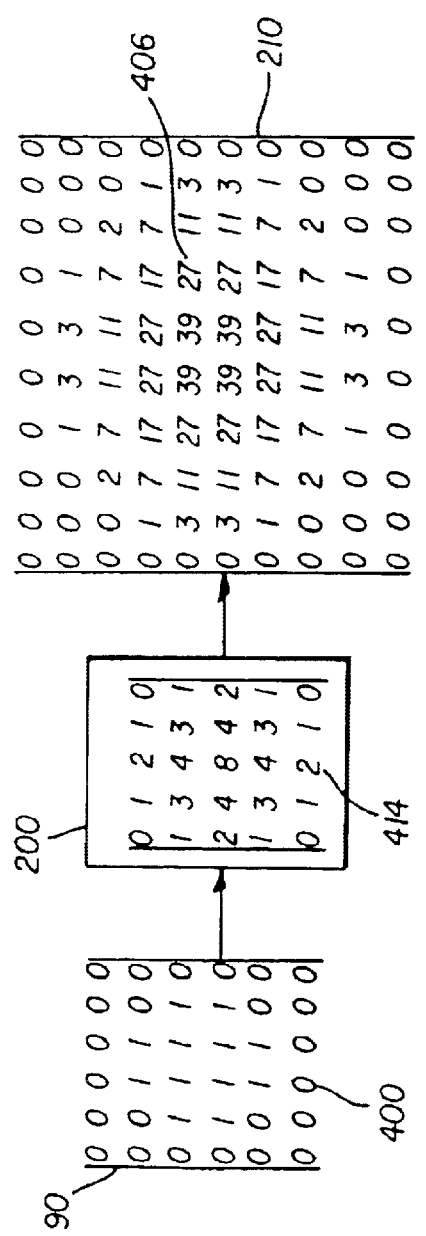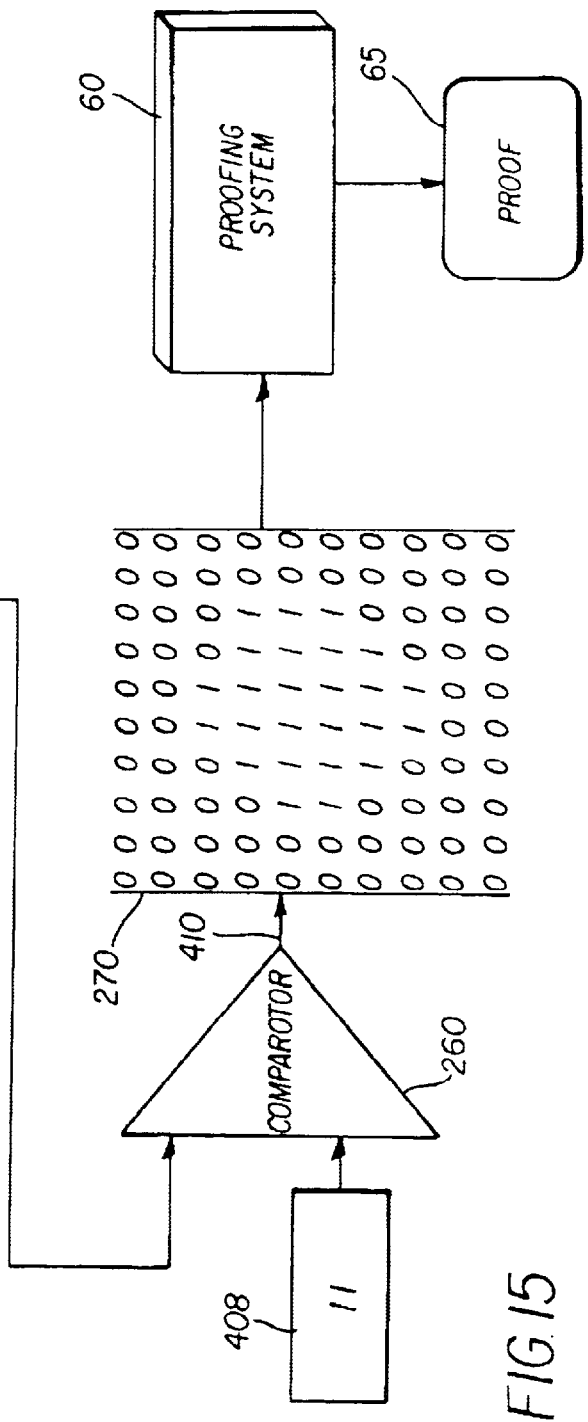
FIG. 15

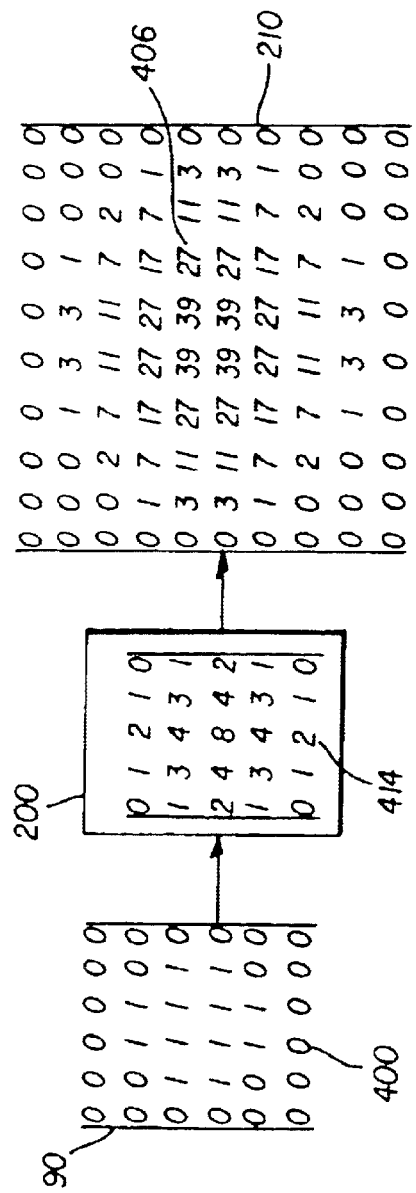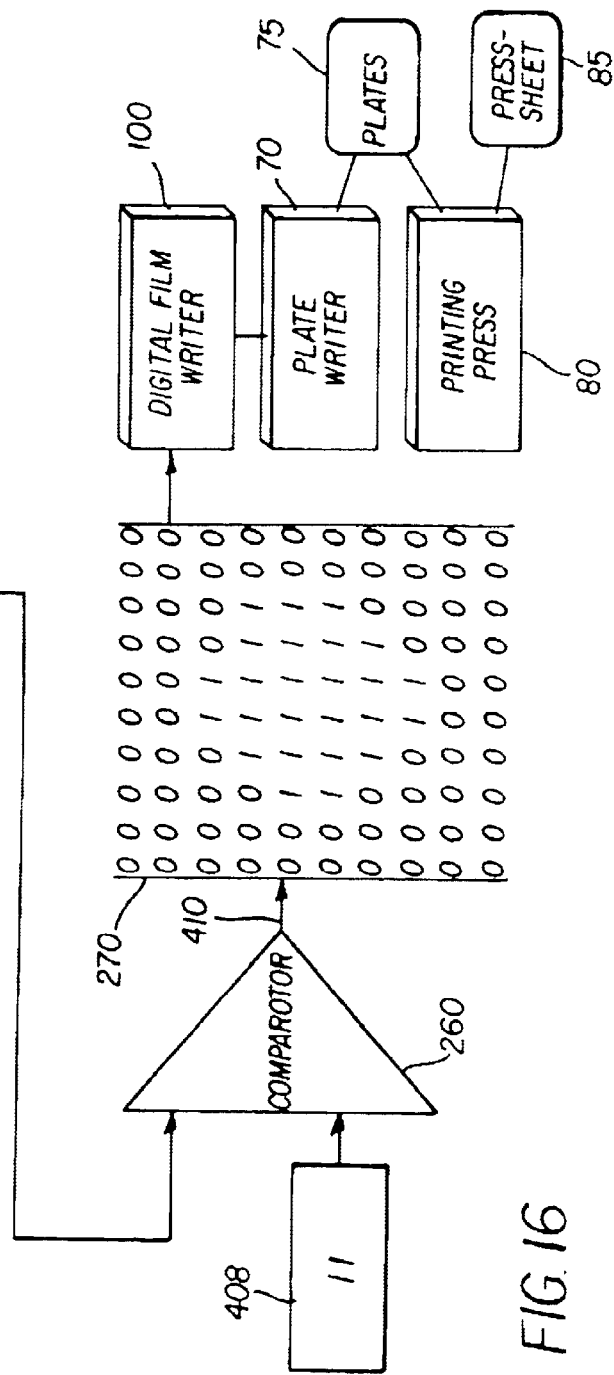
FIG. 16

METHOD FOR ADJUSTING DOT-GAIN FOR A HALFTONE BINARY BITMAP

FIELD OF THE INVENTION

This invention relates in general to proofing bitmap file prior to making printing plates and in particular to adjusting dot-gain for a halftone binary bitmap.

BACKGROUND OF THE INVENTION

In a digital printing workflow there is a need to be able to proof bitmap files used to make printing plates. Presently, customer artwork consisting of contone images, linework, and text, is first sent to a digital halftone proofer or inkjet printer. The artwork is corrected until the proof is approved for the press. In the case were the artwork is proofed on a digital halftone proofer such as described by Baek et al. in U.S. Pat. No. 5,164,742, the raster image processor (RIP) adjusts the input continuous tone data using a calibration dot-gain curve such that the tone-scale of the proof matches the tone-scale of the press-sheet. After the proof is approved, the job is sent to a second RIP which applies a second dot-gain curve for generating the plate used in the press-run.

The first and second RIPs may be the same but are typically separate and may be located apart from each other. The first and second RIPs are preferably the same type and version such that the halftone dots created and algorithms used by each device are an exact match. Many times the two RIPs are not an exact match, which can create problems. Sometimes incorrect dot-gain correction files are used. Sometimes the artwork is changed in-between creating the proof and the plates and the press-run no longer matches the approved proof.

Another disadvantage in the current system is that an error in the creation of the bitmaps for printing is not known until the plates are loaded onto the press and the press-run is started. For a press capable of over 1,000 impressions per hour a considerable amount of production is lost if the plates are found to be corrupt and need to be remade.

An important aspect in creating a halftone proof is predicting dot-gain or tone-scale. Dot-gain is a known phenomenon attributable to ink spread, ink absorption by the print media, and optical effects between the ink and the paper. The dot-gain varies with the size and shape of the halftone dots, the printing device, the inks, and the paper used, etc. For a digital proof, halftone dots in a color separation are composed of micro-pixels that give the halftone dot its shape and size. Dot-gain for a digital proof corresponds to increasing dot size by adding micro-pixels. Dot-loss for a digital proof corresponds to decreasing dot size by eliminating micro-pixels. Dot-gain correction consists of adding and subtracting gain to match the response at different percent dot inputs.

In the printer described by Baek et al. many steps are required to match the press. First, the exposure for each color plane is adjusted to match the solid area density. Second, the dot-gain for each color plane is adjusted to achieve a dot-gain match at different halftone tint levels. Third, the dot-gain curves and density levels may be fine tuned to achieve either a good neutral match in the three color overprints or a color match for flesh tones. For some work, other memory colors such as green grass or light blue sky may be matched as the critical color. Finally, the dot-gain curves may be further adjusted to deliver better performance in the highlight, or shadow areas. These steps are critical and typically take much iteration between the proof operator and the customer to achieve the look that the customer desires. It is important to be able to adjust the proofer to achieve this look as there are other controls on the press that may be adjusted to affect the dot-gain and tonal control of the press-run. By adjusting the performance of the proofer, the customer is selecting the quality of the proofs that will be used by the pressmen to match.

Once the proofer has been setup to match the press, the customer uses subsequent proofs to setup the press. This is an important point. The proofer setup is used to simulate the press such that the pressman may then use the proofs to setup the press to achieve the customer's intent. Every job going through the proofer will be adjusted with a setup. There may be different setups for each press or press type. There may also be different setups for different customers using the same proofer. Finally there may also be standard setups that are used to simulate jobs across many different presses.

The same job is typically "ripped" again when going to press. This time the RIP is programmed to generate 50% area coverage on plate for the 50% color input. The press is then run to deliver a fixed amount of gain at the 50% input level. Dot-gain is due to the smearing of the ink from the plate to a blanket, the smearing of ink from the blanket to the job paper, and the optical gain of the ink on top of the paper. The control is usually split between the plate making device delivering 50% area coverage for a 50% input, and the press delivering 50% plus its intrinsic dot-gain. Typical dot-gain levels for a Web-fed offset press are 15% to 25% at the 50% input level. Because the dot-gain occurs on the press instead of at the plate writer the bitmaps used to create the plate will not contain enough gain to make the proof. Proofs made from these bitmaps will be washed out and the contrast will be significantly reduced. Colors will also shifts as the gain in each color will be proportional to the dot area coverage.

Other digital halftone printing devices such as that disclosed by Michalson in U.S. Pat. No. 6,204,874 use a binary proofing media that does not allow for adjusting the density level of the solid colorants. A different process is used to adjust these devices for a close press match, including adjusting the tone-scale or dot-gain curve used to make the bitmap file. However, the ideal dot-gain curve on these systems is still different from the dot-gain curves used to make the plates even if the same machine is imaging the plate and the proof as disclosed by Michalson.

Inkjet printing devices are also sometimes used to make a proof. These devices typically image from 300 dpi to 1440 dpi writing resolutions using multiple cyan, magenta, yellow, and sometimes black inks. In addition software such as "Best Screen Proof" available from Best Gmbh, or Black Magic available from Serendipity Software Pty Ltd., may be used to simulate the printing of a halftone screen. This software attempts to measure the halftone screen and adjust the printed output to achieve a close color match to a given target. Resolution of the inkjet devices does not allow for a good match of the halftone dot structure. The color match developed does simulate the tone-scale or dot-gain correction, but only through the driving of the overlapping colors on the proof. The quality of the halftone in the printed proof is significantly compromised. Dots in the highlight and shadow areas are destroyed in trying to match the overall density level in these systems. This is because the inkjet output drops are too large. Therefore one inkjet drop is used to replace many halftone dots in the highlight or bright areas, while one inkjet hole is used to replace many halftone holes in the shadows.

A halftone screen at 150 lines per inch, 6 lines per mm, covers an area of approximately 28,674 $\mu m^2$. An inkjet printer with a 3 pL drop size will produce a dot with a diameter of about 25 μm covering an area of 625 μm². This may vary depending upon the spread into the paper. A single inkjet drop represents a 2.18% change in area within a 150 line screen halftone. To achieve finer resolution the Best Screen Proof, and Black Magic, software use additional inks to image multi-level colorants. Typically light cyan and light magenta inks are added to the cyan, magenta, yellow, and black primaries to achieve finer control of the tone-scale. While this creates a proof with a close visual color match, the structure of the halftone dots within the image is seriously degraded.

A conventional proofing solution is to RIP the file for proofing separate from ripping the file for printing, adding dot-gain to the proofing file as part of the ripping process. U.S. Pat. No. 5,255,085 describes a method to adjust the tone reproduction curve of a press or output printer. U.S. Pat. No. 5,255,085 creates a target from the press or desired output proof, benchmarks the characteristics of the proofing device, and discloses a method to generate a lookup table to adjust the dot-gain of the original file to achieve the aim on the proofing device. U.S. Pat. No. 5,293,539 adds adaptive process values to interpolate between measured Benchmark and Aim data sets to calibrate the dot-gain tone-scale curve at other screen rulings, screen angles, and dot shapes. Utilizing these techniques to modify the dot-gain curves and hence the tone-scale curves of the proofing device increases the chances for error. The input file and its subsequent components must be available for both RIPs. The same versions of each file and components must be specified. The same fonts must be available for both RIPs. The correct dot-gain curve must be specified at both RIPs. The chances for error to occur increase with each ripping operation, especially when the RIPs are located at separate sites.

Ripping the file twice is also time consuming. Each RIP operation must read the input files, decide where each of the components is to be placed in the output print, convert continuous tone images using the correct dot-gain curve into high resolution halftones, render text and linework, and output a high resolution bitmap which represents the composite image. This is repeated for each color in the output print.

Once commercial halftone proofer implements dot-gain by modifying the code values being printed through a curve prior to converting the code values into the halftone bitmap with the raster image processor. The dot-gain is only applied to the continuous tone image data and not the line work or text. The dot-gain may be adjusted for each of the primary colors cyan, magenta, yellow, and black. A dot-gain curve may also be specified for spot colors orange, green, red, blue, white, and metallic. A dot-gain curve may also be specified for a Equation 1 Murray Daives Dot Area Calculation $$PercentArea = \frac{10^{-D_{tint}} - 10^{-D_{paper}}}{10^{-D_{solid}} - 10^{-D_{paper}}}$$

recipe color which is imaged using a single bitmap in combination with two or more standard colors at unique exposure levels. A dot-gain curve may also be specified for each colorant within a recipe color. In this last case more than one bitmap is used, however the halftone dots are at the same screen ruling, screen angle, and phase, such that each halftone dot in each color substantially overlap.

A typical example is a target curve. Such a target might specify that the 50% cyan halftone should print at 67%, the 25% cyan halftone should print at 35%, and the 75% cyan halftone should print at 80%. A benchmark proof is then run and measured. Dot area is calculated based on measured density using the equation defined by Murray-Davies. Equation 1 is the Murray-Davies equation is defined in ANSI/CGATS.41993, 1993, p. 7. A dot-gain adjustment curve is then created to add the correct amount to cyan to achieve the target values at the target inputs. For instance in this example we might find that an output value of 35% was achieved at an input level of 30% in the benchmark proof. Therefore 5% dot-gain at the 25% input level is added to achieve the 35% target. At the 50% level we may find we achieved the target level of 67% at an input level of 57% requiring us to add 7% at the 50% input. At the 75% level we may find we achieved the 80% target at the 76% input requiring 1% dot-gain. In actual practice we may measure the dot-gain in 5% or 10% steps with some additional measurements between 0 to 10% and 90 to 100%. A spline curve is usually fit to the resulting dot-gain curve to provide a table in 1% input increments or less. Smoothing is sometimes performed on the input target and benchmark data to further reduce artifacts in the adjustment process.

Perup Oskofot has shown a software program, which operates on high resolution scans from their scanners. The program takes a binary high-resolution scan of a halftone film and de-screens it to a lower resolution continuous tone image. Typically the scan resolution is 2400 dpi. The resulting continuous tone image may be 8 bits per pixel at 300 dpi resolution. A dot-gain curve is then applied to the de-screened image. The adjusted image is then ripped to a bitmap image at 2400 dpi. This software system was disclosed at Drupa 2000, a tradeshow. One problem with this method is that it requires a re-ripping step. To accomplish this requires a RIP. Plus we need to know what the original halftone screen shape, screen ruling, and screen angle were in order to faithfully reproduce it with the re-ripping step. Another problem is that all RIPs are not the same. There are subtle differences between them such as the method that they use to add noise to hide the quantization affects in screening the image. This means that one RIP may not sufficiently reproduce all the screens that the customer might digitize. Another problem with this method is that it is extremely slow. A small 8×10 inch image at 2400 dpi scanned resolution took more than an hour to process a single color plane.

Additionally, some customers have halftone films, which they would like to use in their digital workflow. These customers scan the film at a high resolution, for example 100 pixels/mm, and quantize each pixel to a binary value. Because the dot-gain is built into the film, there is no method other than de-screening the bitmap file, adding dot-gain, and re-ripping the file, to calibrate the output print. If the original film was made using an optical technique then the dot shape, screen ruling, and screen angle may not be an exact match to a digital RIP. De-screening and re-screening the high resolution scan may not faithfully reproduce the original screens.

Denber et al. disclose a method of shifting and adding a bitmap image with itself to thin the image displayed in U.S. Pat. No. 5,250,934. Denber discloses a method of setting a bit to an intermediate level if it is diagonally between two active bits using shifting, logical and, and a logical or operation.

U.S. Pat. No. 5,483,351 discloses using a 4×4 input to a lookup table to determine how to operate on the central 2×2 pixels to implement halfbit or fullbit dilation and erosion in U.S. Pat. No. 5,483,351. U.S. Pat. No. 5,483,351 has the advantage of knowing some of the surrounding pixels in deciding how to dilate or erode the pixels in the center. Eschbach teaches us in U.S. Pat. No. 5,258,854 how to resize bitmap images in small amounts less than one full bit in size.

Loce et al. discloses logically combining two morphological filter pairs and an original image to create an output image in U.S. Pat. No. 5,680,485. The morphological filters described are erosion filters, one of which has less erosion than desired and the other having more erosion than desired. Logically combining combinations of the original image with the two eroded images provides for a method of obtaining an intermediate result.

Eschback describes a method of resizing an input bitmap in U.S. Pat. No. 5,208,871, which simulates a scan of an output image from an input bitmap such that the scan resolution is different from the input bitmap. Error diffusion is utilized to quantize the output bitmap into the desired output bit resolution. This example uses error diffusion to spread out the error in the quantization of a multilevel pixel into a reduced number of output states.

U.S. Pat. No. 6,115,140 uses a de-screened version of an original image, and dilated and eroded versions of the original image to select a combination of the original, dilated, and eroded images to effect a dot-gain or tone-scale change in an input bitmap image. U.S. Pat. No. 6,115,140, FIG. 5B shows an original halftone image input into block H1 along with an eroded version (HE), and two dilated versions (HD1 and HD2). Then a weight based on de-screened versions of the original halftone (CO), the color corrected original (CI), the eroded original (CE), and the two dilated originals (CD1 and CD2) is calculated. The de-screened images are used to select which of the four halftone images, H1, HE, HD1, and HD2, are transferred into H1 and H2. The weighting function is then used to merge bitmap versions of H1 and H2 together into the tone-scaled output bitmap (HO). How to de-screen is not disclosed, nor exactly how to calculate which bit of H1 and H2 is used to drive the output bit HO. The need to use error diffusion to distribute the error in selecting between H1 or H2 is not mentioned.

In U.S. Pat. No. 6,115,140 dilation is described as growing a single pixel completely around the halftone feature. A second dilation grows two pixels completely around the halftone feature. Similarly erosion subtracts a single pixel completely around the halftone feature.

None of the Bressler et al. references teach how to perform de-screening. Roetling performs de-screening by comparing the number of white and dark pixels within a specified area in U.S. Pat. No. 4,630,125. U.S. Pat. No. 4,630,125 also states that "A partial solution known in the art is to spatially filter the halftone image with a low pass filter." U.S. Pat. No. 4,630,125 teaches that the spatial filter method is not exact as it tends to blur the original image.

U.S. Pat. No. 5,767,887 issued to Warner discloses using a Raster Image Processor with two lookup tables for dot-gain. One lookup table is recommended for creating a proof. A second lookup table or dot-gain is recommended for making a plate. The image is processed two times through the raster image processor. Warner disclosed imaging the proof and the plate on the same machine, with the same raster image processor. This is not always possible if the proof and the plate are needed in different locations.

Furusawa et al. in U.S. Pat. No. 5,721,625 discloses using a digital filter to filter an input continuous tone image and use the filtered output to select from multiple dot generators or raster image processors. Furusawa selects a dot created using a traditional amplitude modulated screen for areas of the print that contain low frequency information. Furusawa selects a dot created using frequency modulated screens for areas of the print that contain high frequency information. The frequency content of the image is output from the digital filter.

SUMMARY OF THE INVENTION

The invention relates to a method for adjusting dot-gain for a halftone binary bitmap file involving the steps of inputting a halftone binary bitmap file consisting of binary pixels to a digital filter, then filtering the binary pixels with the digital filter and generating a weighted sum of the pixels. Using the weighted sum, a multilevel pixel is produced and then compared to a preset level and a binary pixel output is then generated. The binary pixel output is then collected forming an adjusted halftone binary bitmap file.

The invention also relates to a method for adjusting dot-gain for a halftone binary print by inputting a halftone binary bitmap file consisting of binary pixels to a digital filter, filtering the binary pixels with the digital filter and generating a weighted sum of the pixels; producing a multilevel pixel from the weighted sum; comparing the multilevel pixel to a preset level and generating a binary pixel output; collecting the binary pixel output and forming an adjusted halftone binary bitmap file; and printing the halftone binary bitmap file.

The invention also relates to a method for adjusting dot-gain for a printing plate by inputting a halftone binary bitmap file consisting of binary pixels to a digital filter, filtering the binary pixels with the digital filter generating a weighted sum of the pixels; producing a multilevel pixel from the weighted sum; comparing the multilevel pixel to a preset level and generating a binary pixel output; collecting the binary pixel output and forming an adjusted halftone binary bitmap file; and exposing a printing plate to the adjusted halftone binary bitmap file.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 6a shows an input bitmap;

FIG. 6b shows an output bitmap with gain;

FIG. 6c shows an output bitmap with dot loss;

FIG. 15 shows the method for adjusting dot-gain for a halftone binary print comprising the steps mentioned in FIG. 1, however, after the binary pixel output is collected and the adjusted halftone binary bitmap file is formed, the halftone binary bitmap file is then printed;

FIG. 16 shows a method for adjusting dot-gain for a printing plate comprising the steps noted in FIG. 2 plus the step of sending the output to a plate writer exposing a printing plate to the adjusted halftone binary bitmap file after the adjusted halftone binary bitmap file is formed.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
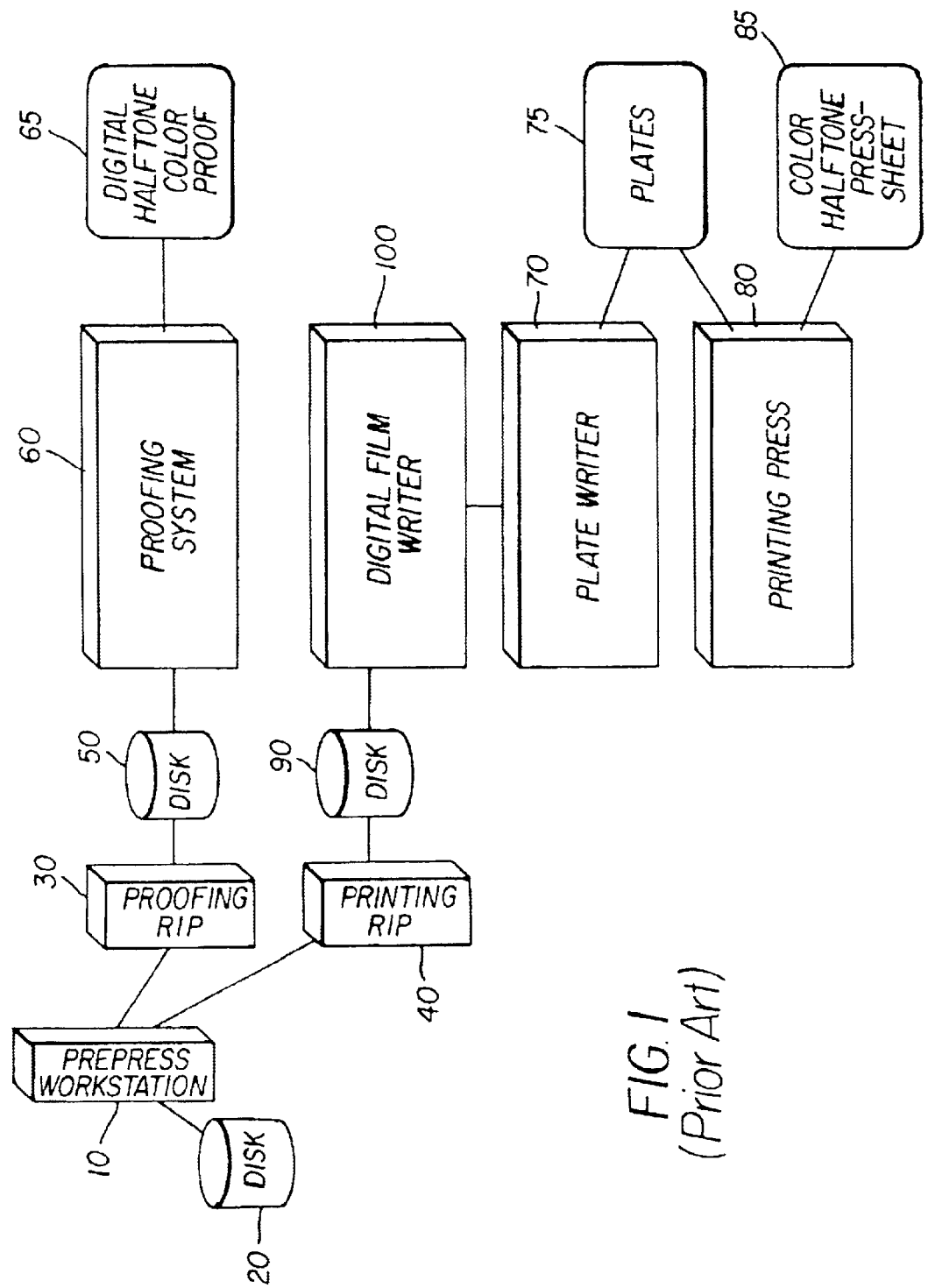
FIG. 1 is a block diagram showing the conventional workflow for digital halftone file processing.

Referring to FIG. 1, there is shown a prepress workstation 10, with customer artwork stored on disk 20. The customer may store images, text and line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to either the RIP for proofing 30, or the RIP for printing 40. Each RIP may consist of a software RIP running on a PC such as Harlequin "ScriptWorks" by Global Graphics Software LTD.

RIP 30 has a postscript text file, which specifies the dot-gain adjustment for proofing to be applied to all of the continuous tone images within the customer job. This file contains the input and output percent dot relationships for all the colors in the job. The procedure to create this lookup table is described by Spence and implemented in Kodak software, "Dot-gain Manager," which is available in Kodak Approval Digital Halftone Proofers. The RIP will convert CMYK continuous tone images through the dot-gain lookup table. Then the RIP will convert the continuous tone image into a halftone image at the writing resolution of the proofing system 60. The halftone bitmap images may be sent directly from RIP 30 to printer 60 or they may be temporarily stored on disk 50. The proofing system outputs a digital halftone color proof 65.

RIP 40 will have a similar postscript text file that specifies the dot-gain adjustment for press to be applied to all of the continuous tone images within the customer job. The dot-gain curve on RIP 40 may be used to linearize the plate such that a 50% input creates 50% dot area coverage on plate. The 50% dot area coverage on the plate then produces a press-sheet on press with additional gain. The plate writer 70 may have an intrinsic gain associated with it, which is compensated for in the same dot-gain curve in RIP 40. The plate writing system 70 may be positive or negative writing, such that areas exposed on plate may accept or reject ink on press. The positive or negative sense of the plate writer will typically require negative or positive dot-gain adjustment to create a linear plate. Typically plate writers have a loss or gain of 1% to 3%.

The plate writing system 70 may be co-located in the printing press 80. In this case the press contains additional capability of being able to image the printing plates 75 which are already mounted on the press.

A digital film writer 100 may precede the plate writing system. The bitmaps used to make the film or plate may be stored temporarily on disk 90 prior to making the film or plate. If a digital film writer is used then the films may be used to make the plate by making an optical contact exposure. This is a well known process in the art. The additional dot-gain or dot loss due to the contact exposure and processing of the plate may be compensated for in the dot-gain curves used to make the film.

It is understood that there may also be iterative steps of making film and plates with the end result of a plate being mounted in the press used to create a press-sheet with the customer artwork. The dot-gain curve used in RIP 40 may contain compensation for all of the steps used to create the plate. In addition the dot-gain curve in RIP 40 may also contain compensation for a given press to achieve a desired target.

The plate writing system 70 outputs a set of digital plates 75 used in the printing press 80 to create color halftone press-sheets 85. Note that the invention may also be used in black and white, single, or multiple color systems and is not limited to process color, Cyan, Magenta, Yellow, and Black, printing systems.

Figure 2:
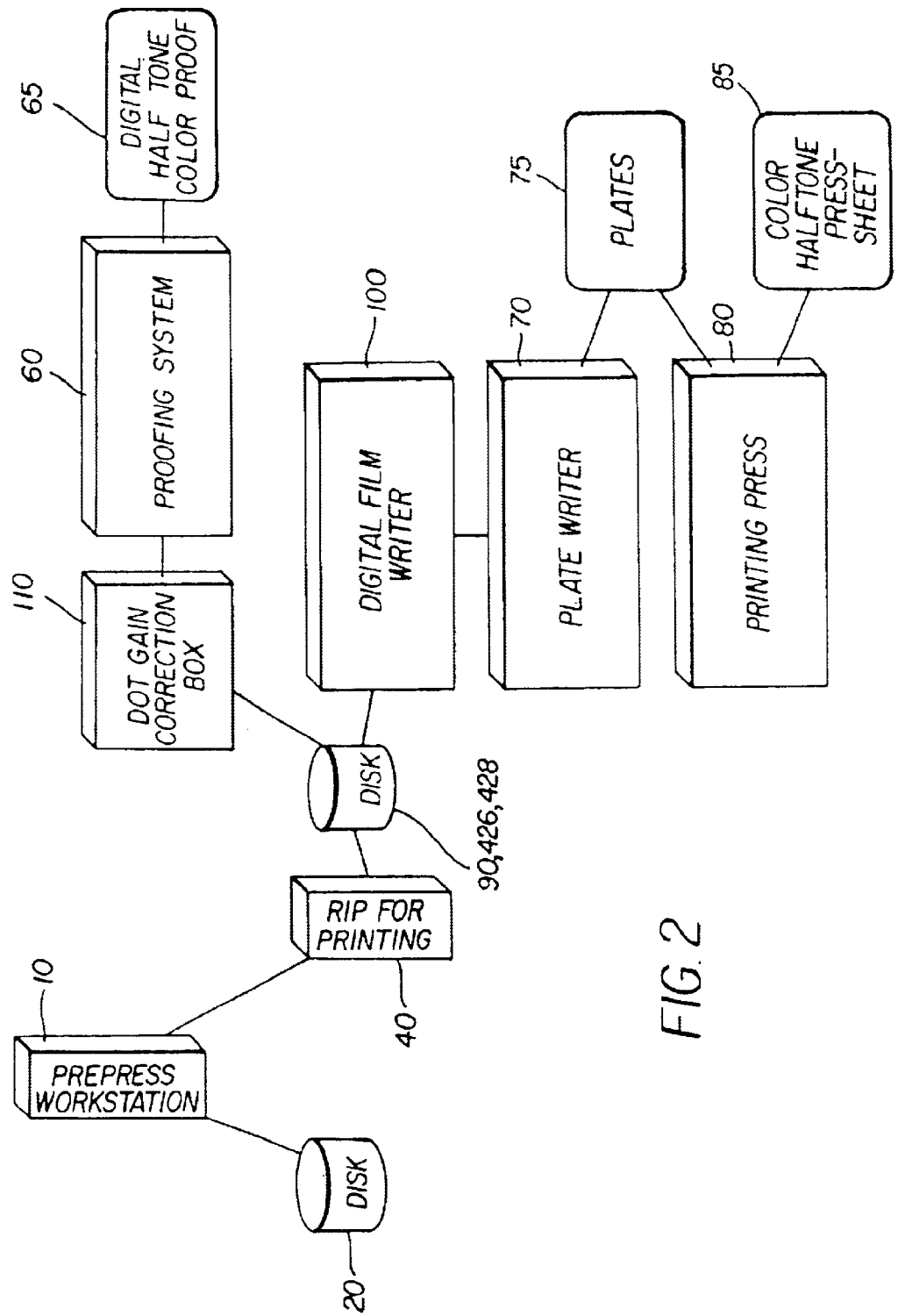
FIG. 2 is a block diagram showing the method of the present invention for adding dot-gain to a digital halftone file to make a proof.

Referring now to FIG. 2, customer artwork is stored on disk 20. The customer may store images, text and, line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to the RIP 40 for printing and or proofing. The RIP may consist of a software RIP running on a PC such as Harlequin "ScriptWorks" by Global Graphics Software LTD.

The RIP 40 will convert the customer artwork into binary halftone files which may be stored on disk 90 on their way to plate writer 70. The binary data will be screened at a screen ruling 426 and screen angle 428. This information may also be stored on disk 90.

RIP 40 will have a postscript text file which will specify the dot-gain adjustment for press to apply to all of the continuous tone images within the customer job. The dot-gain curve on RIP 40 may be used to linearize the plate such that a 50% input creates 50% dot area coverage on plate. The 50% dot area coverage on the plate then produces a press-sheet on press with additional gain. The plate writer 70 may have an intrinsic gain associated with it, which is compensated for in the dot-gain curve in RIP 40. The plate writing system 70 may be positive or negative writing, such that areas exposed on plate may accept or reject ink on press. The positive or negative sense of the plate writer will typically require negative or positive dot-gain adjustment to create a linear plate. Typically plate writers have a loss or gain of 1% to 3%.

The plate writing system 70 may be co-located in the printing press 80. In this case the press contains additional capability of being able to image the printing plates which are already mounted on the press.

A digital film writer 100 may precede the plate writing system. The bitmaps used to make the film or plate may be stored temporarily on disk 90 prior to making the film or plate. If a digital film writer is used then the films may be used to make the plate by making an optical contact exposure. This is a well known process in the art. The additional dot-gain or dot loss due to the contact exposure and processing of the plate may be compensated for in the dot-gain curves used to make the film.

It is understood that there may also be iterative steps of making film and plates with the end result of a plate being mounted in the press used to create a press-sheet with the customer artwork. The dot-gain curve used in RIP 40 may contain compensation for all of the steps used to create the plate. In addition the dot-gain curve in RIP 40 may also contain compensation for a given press to achieve a desired target.

The plate writing system 70 outputs a set of printing plates 75 used in the printing press 80 to create color halftone press-sheets 85.

The bitmap images stored or copied to disk may also be sent using dot-gain correction box 110 to the proofing system 60. In this case the dot-gain correction box 110 would be programmed to unbuild the dot-gain curves used to make the plates and add the dot-gain correction required to allow the proofing system 60 to match the target. The unbuild and dot-gain correction is performed in one step using a single combined curve.

To obtain the dot-gain curve used in the dot-gain on bitmap calculation the customer runs a test proof through the RIP 40 to make plates 75 and a press-sheet 85 on press 80. The press-sheet 85 made with the test proof is measured and becomes the target press-sheet values. The bitmaps made for the test proof are stored in disk 90. These same bitmaps are passed directly to the proofing system 60 bypassing the dot-gain on bitmap calculation 110. The resulting proof is called the benchmark proof 65. The benchmark proof is measured and compared to the target press-sheet values. The dot-gain adjustment required to add to the percent dot into the dot-gain on bitmaps calculator 110 are calculated by finding or calculating the input value resulting in an output value on the benchmark proof required to achieve the output value on the target press-sheet.

Figures 3, 5:
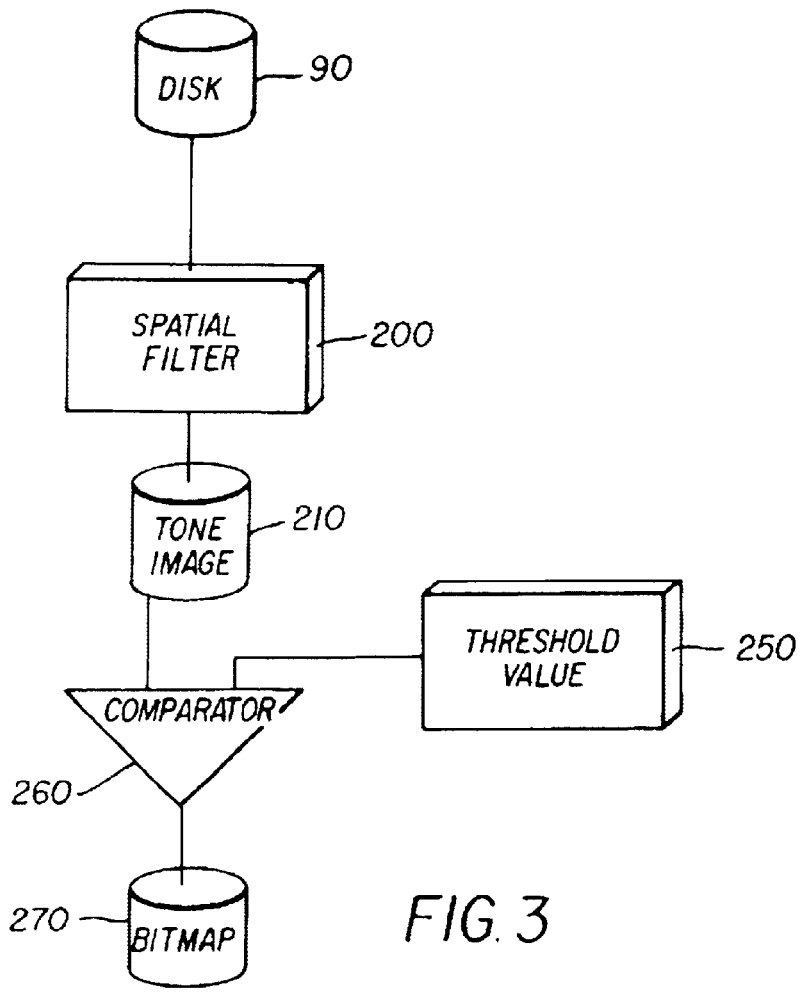
FIG. 3 is a flow diagram showing the processing steps for adding dot-gain compensation to a rasterized halftone digital image file.
FIG. 5 contains a spatial filter used in one example.

The invention is shown in FIG. 3. The halftone bitmap image on plate writing system disk 90 is convolved through a spatial filter 200 to create a blurred continuous tone image 210. For each pixel the level of the blurred image 210 is compared to the threshold value 250 in comparator 260. The output of the comparator 260 is the dot-gain adjusted halftone bitmap 270. This bitmap 270 is then sent to the proofer 60. For this example FIG. 5 is used for the spatial filter 200.

Figure 4:
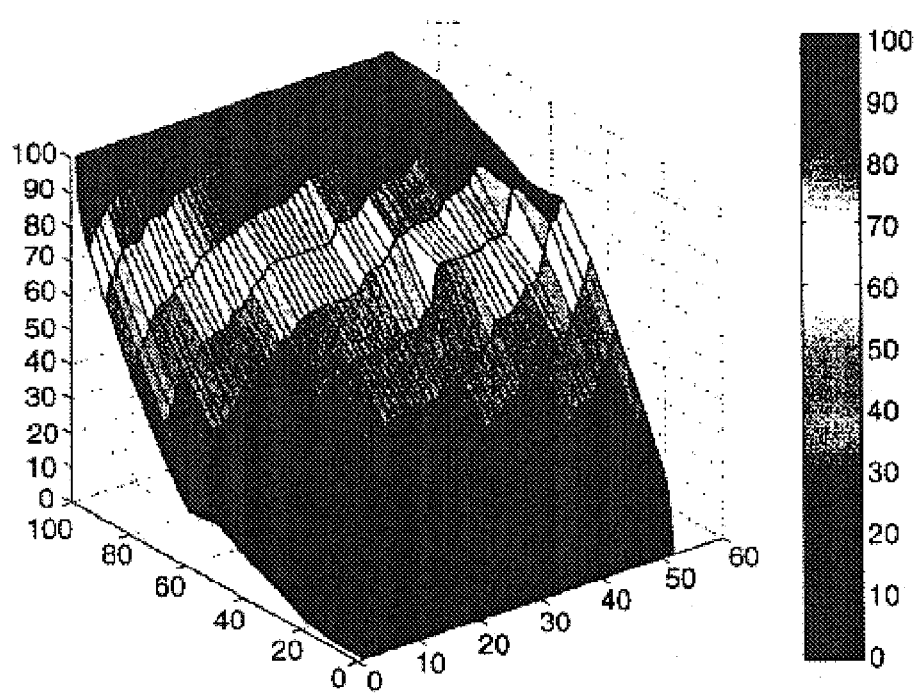
FIG. 4 contains a graph of percent dot out verses percent dot in by threshold value for the dot-gain method described.

FIG. 4 is a plot of the calculated Percent Dot Out verses Percent Dot In and Threshold Level, using a tint scale screened at 150 lines per inch at 45 degrees for writing at 2540 dot per inch, processed through the filter shown in FIG. 5. Increasing the threshold level results in an increase in the dot-gain for a given percent dot input, while decreasing the threshold level results in a decrease in dot-gain for a given percent dot input.

A single bit in a 2540 dot per inch, 100 micro-pixels per mm, bitmap file represents an area of 100 um$^2$. In a 150 line screen halftone, 6 lines per mm., this represents a 0.34% dot change allowing us to faithfully reproduce a given dot-gain target by adding or subtracting micro-pixels within the bitmap file.

FIGS. 6a, 6b, and 6c, are an example showing how the bitmaps might be modified using this invention. FIG. 6a shows an input dot with 12 micro-pixels on, 290. Off micro-pixels are shown as 280. At 2540 dpi writing resolution and 150 dpi halftone screen a halftone dot feature with 12 micro-pixels represents a 4.3% halftone dot. FIG. 6b shows an addition of 5 micro-pixels 300, for an output halftone dot consisting of a total of 17 micro-pixels or approximately 6.12%. FIG. 6c shows a subtraction of 2 micro-pixels 310, for a dot loss of 0.7%. It is our invention that the spatial filter blurs the incoming bitmap, while the threshold and compare operation defines a new outline of the existing halftone dot. This preserves the halftone dot in the output bitmap while adjusting the apparent tonescale of the output image.

Figure 7:
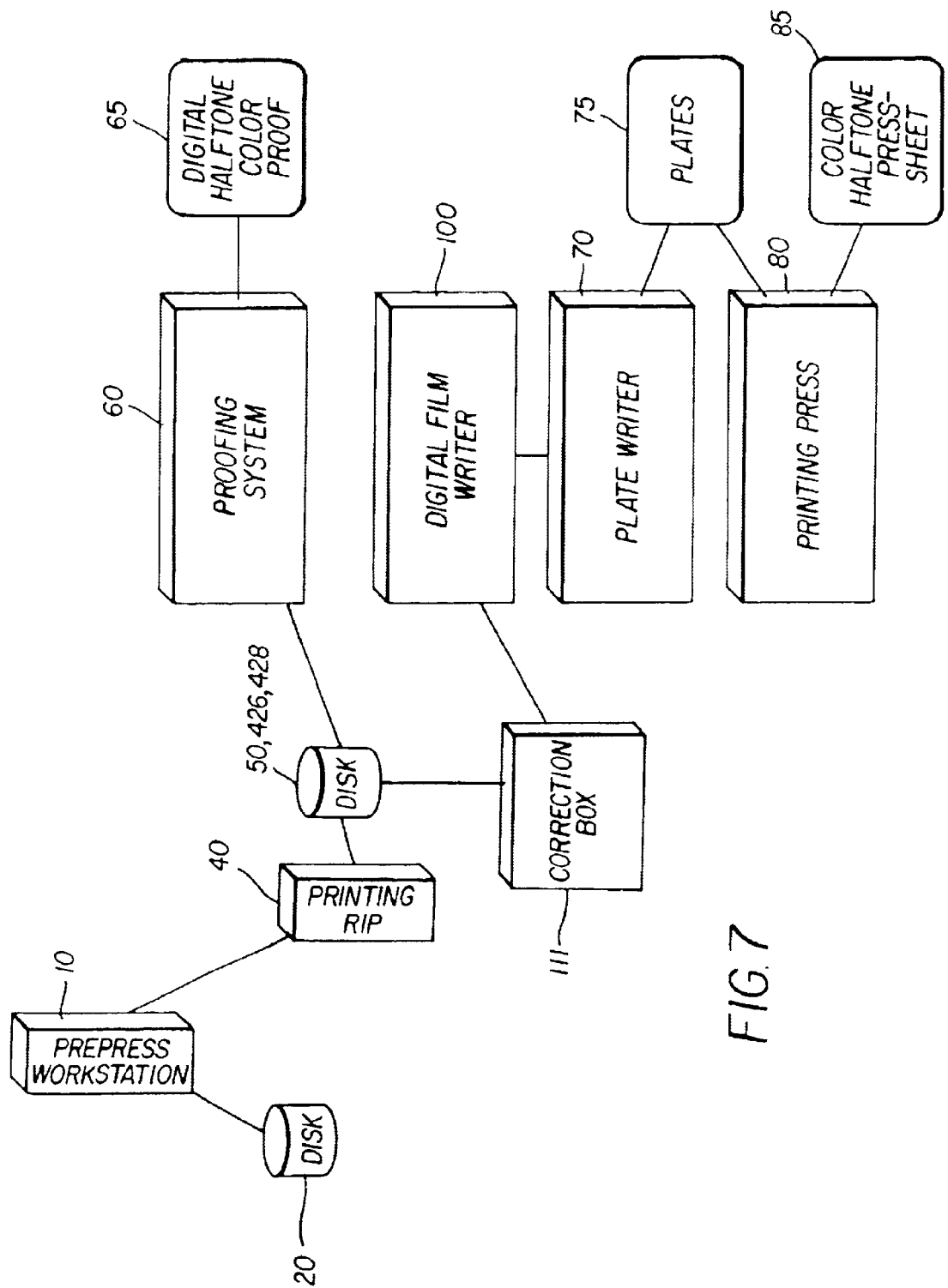
FIG. 7 is a block diagram showing the method of the present invention for adding dot-gain to the digital halftone files used to make the printing plates.

Referring now to FIG. 7 we show another embodiment of our invention. The customer artwork is stored on disk 20. The customer may store images, text and, line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to the RIP 30 for proofing and printing. The RIP may consist of a software RIP running on a PC such as Harlequin "ScriptWorks" by Global Graphics Software LTD. RIP 30 will have a postscript text file which will specify the dot-gain adjustment for proofing to apply to all of the continuous tone images within the customer job. The dot-gain curve on RIP 30 may be used to match a known standard such as the Committee for Graphic Arts Technical Standardization (CGATS) Technical Report 001 (TR001).

The RIP 30 will convert the customer artwork into binary halftone files which may be stored on disk 50 on their way to the proofer 60. The binary data will be screened at a screen ruling 426 and screen angle 428. This information may also be stored on disk 50.

RIP 30 will output cyan, magenta, yellow, and black bitmaps to disk 50 on their way to proofer 60 to create proof 65. The bitmaps for proofing may also be used with our invention 111 to create printing plates 75. Here our invention, 111, dot-gain correction box for printing will be programmed to unbuild the dot-gain correction for proofing and build in the dot-gain correction required such that the press-sheet 85 matches the proof 65.

The plate writing system 70 may be co-located in the printing press 80. In this case the press contains additional capability of being able to image the printing plates which are already mounted on the press.

A digital film writer 100 may precede the plate writing system. The dot-gain correction device 111 would then be programmed to take into account the additional gain or loss required due to the digital film writer, 100, and the contact process of making the plates 75.

It is understood that there may also be iterative steps of making film and plates with the end result of a plate being mounted in the press used to create a press-sheet with the customer artwork. The dot-gain curve used in the dot-gain correction device 111 may contain compensation for all of the steps used to create the plate. In addition the dot-gain curve may also contain compensation for a given press to achieve a desired target.

To obtain the dot-gain curve used in the dot-gain on bitmap calculation the customer runs a test proof through the RIP 30 to make plates 75 and a press-sheet 85 on press 80. The press-sheet 85 made with the test proof is measured and becomes the benchmark press-sheet values. The bitmaps made for the test proof are stored in disk 50. These same bitmaps are passed directly to the proofing system 60. The resulting proof is called the target proof 65. The benchmark proof is measured and compared to the target proof values. The dot-gain adjustment required to add or subtract to the percent dot into the dot-gain on bitmaps calculator 111 are calculated by finding or calculating the input value resulting in an output value on the benchmark proof required to achieve the output value on the target proof.

Figure 8:
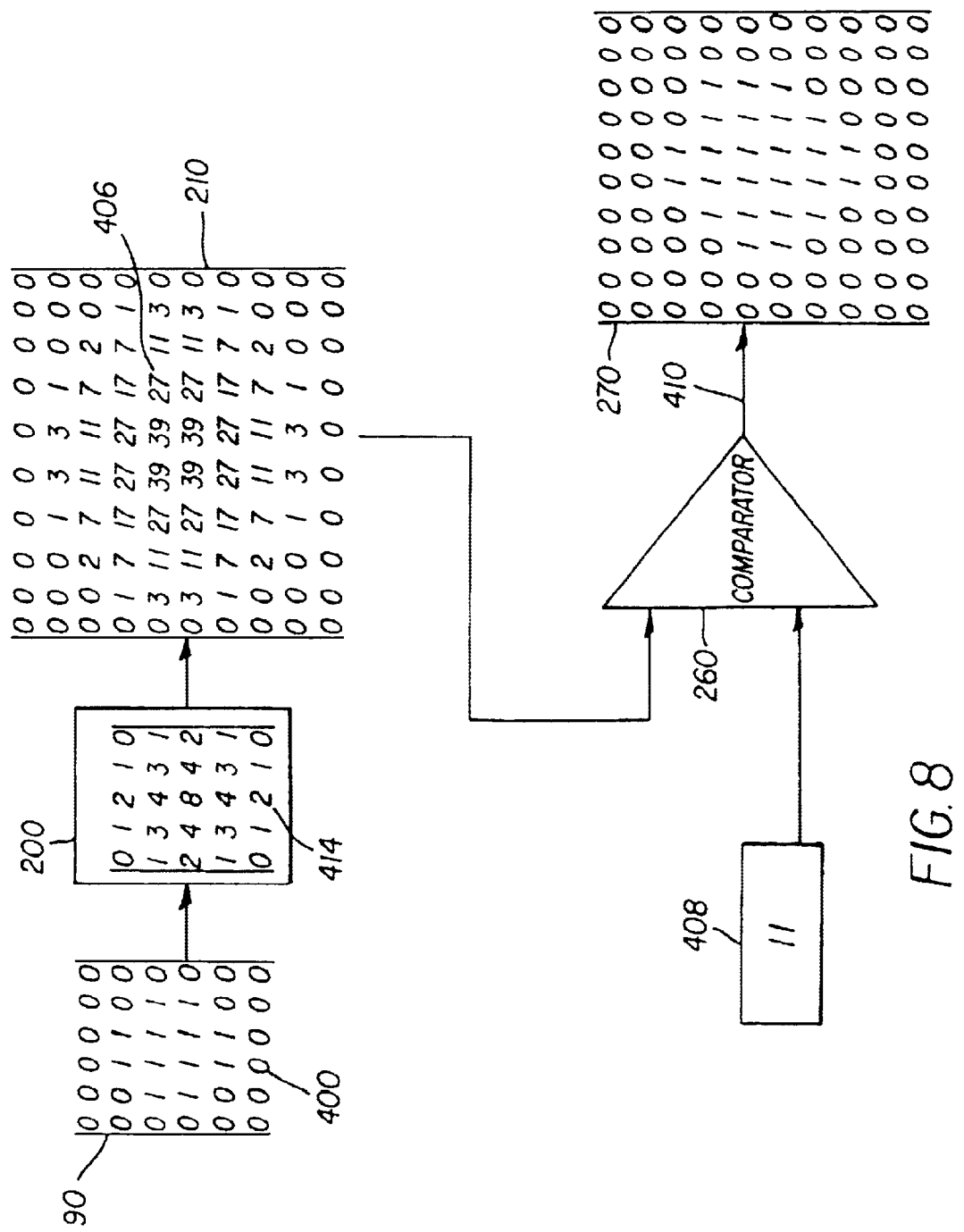
FIG. 8 is a block diagram showing the method of the present invention using a low pass filter.
Figure 9:
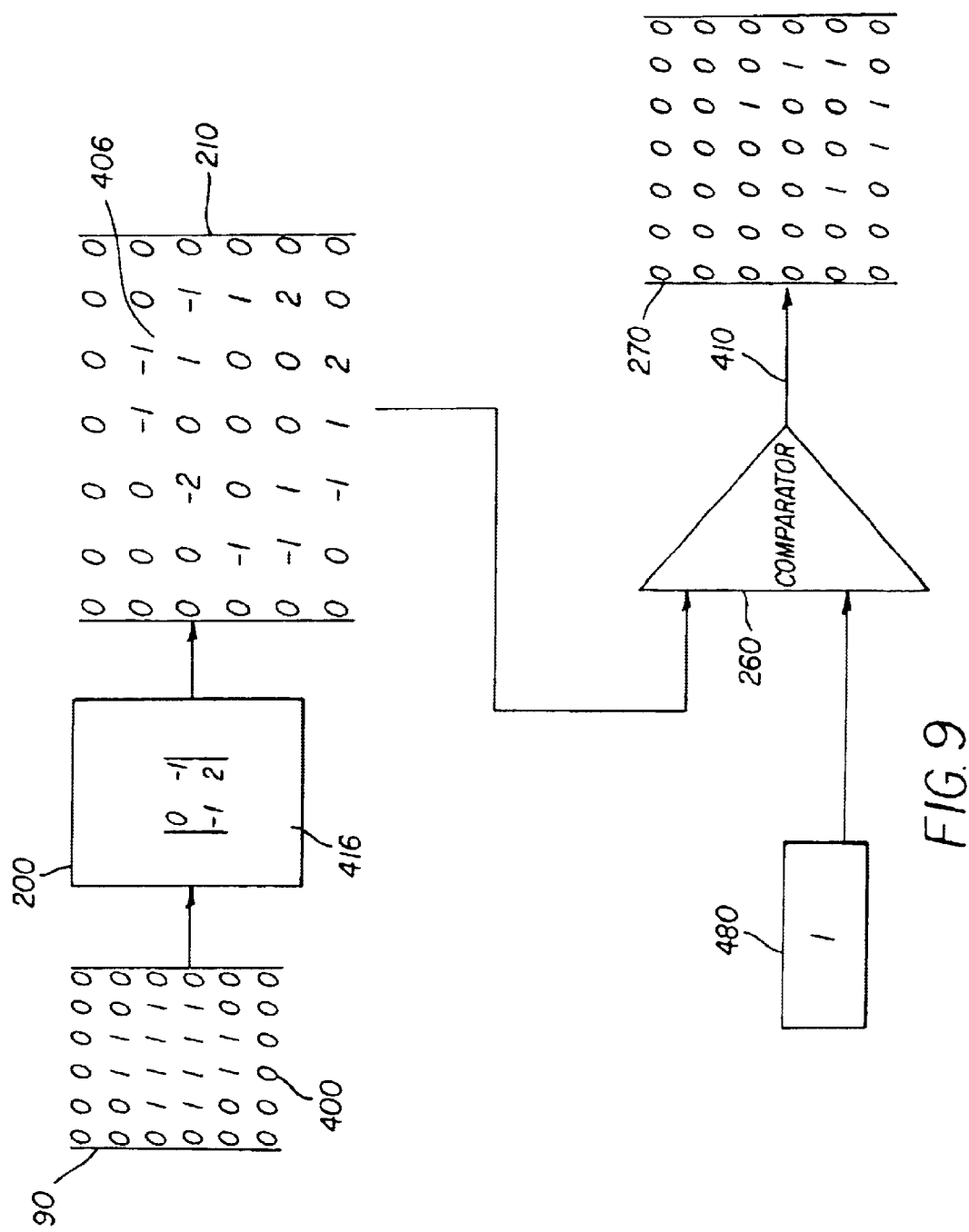
FIG. 9 is a block diagram showing the method of the present invention using an edge enhancement filter.
Figure 10:
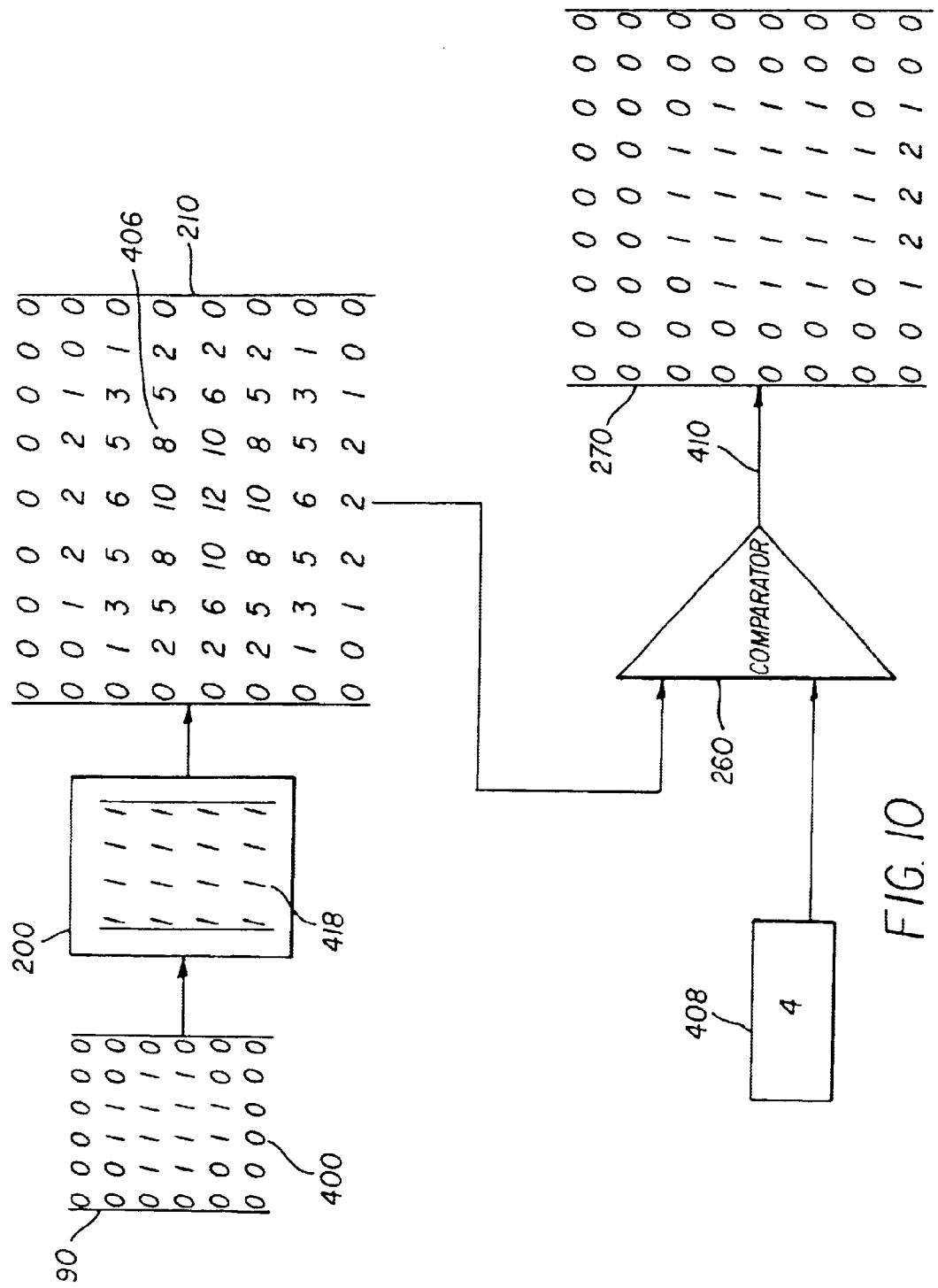
FIG. 10 is a block diagram showing the method of the present invention using an averager filter.
Figure 11:
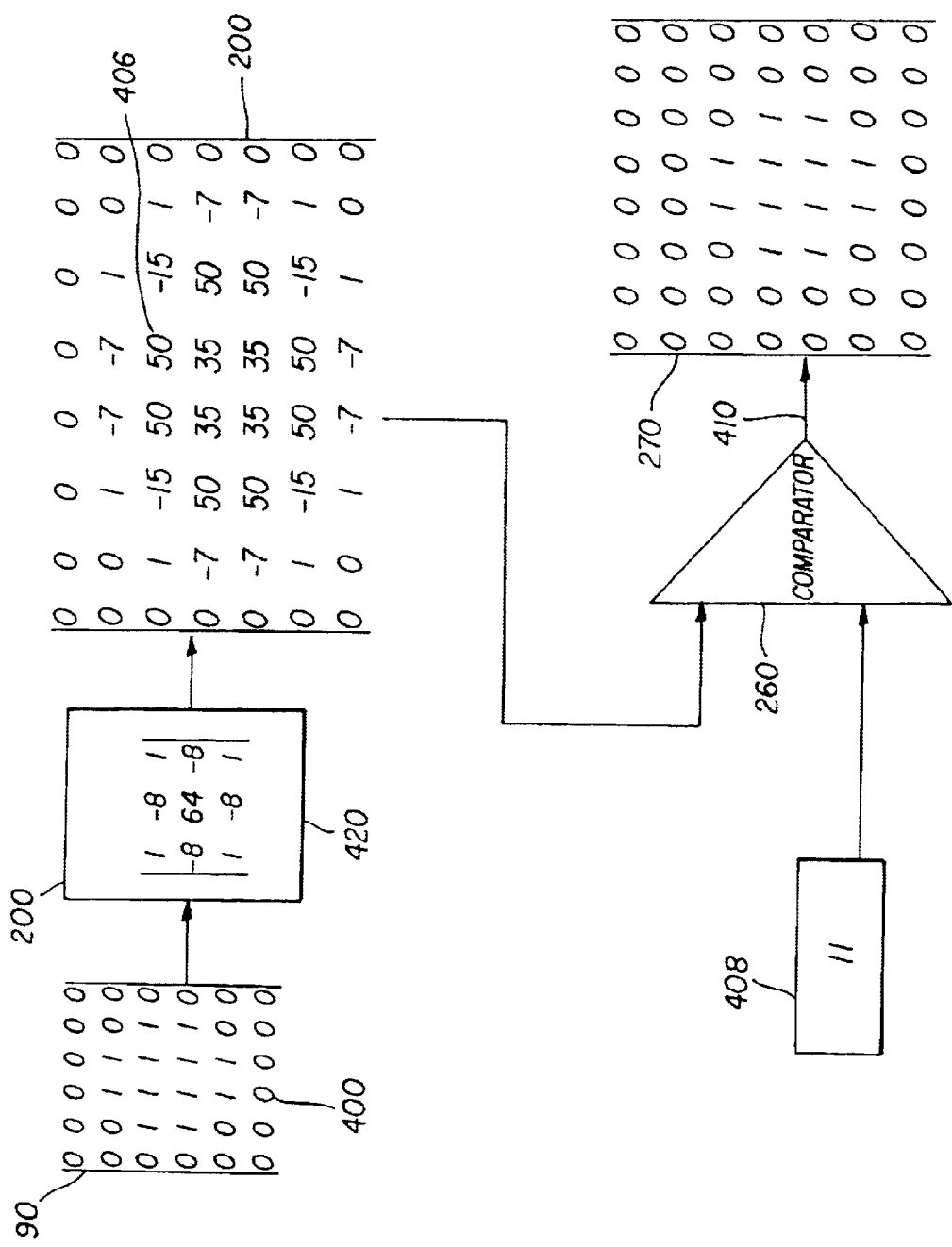
FIG. 11 is a block diagram showing the method of the present invention using a high pass filter.
Figure 12:
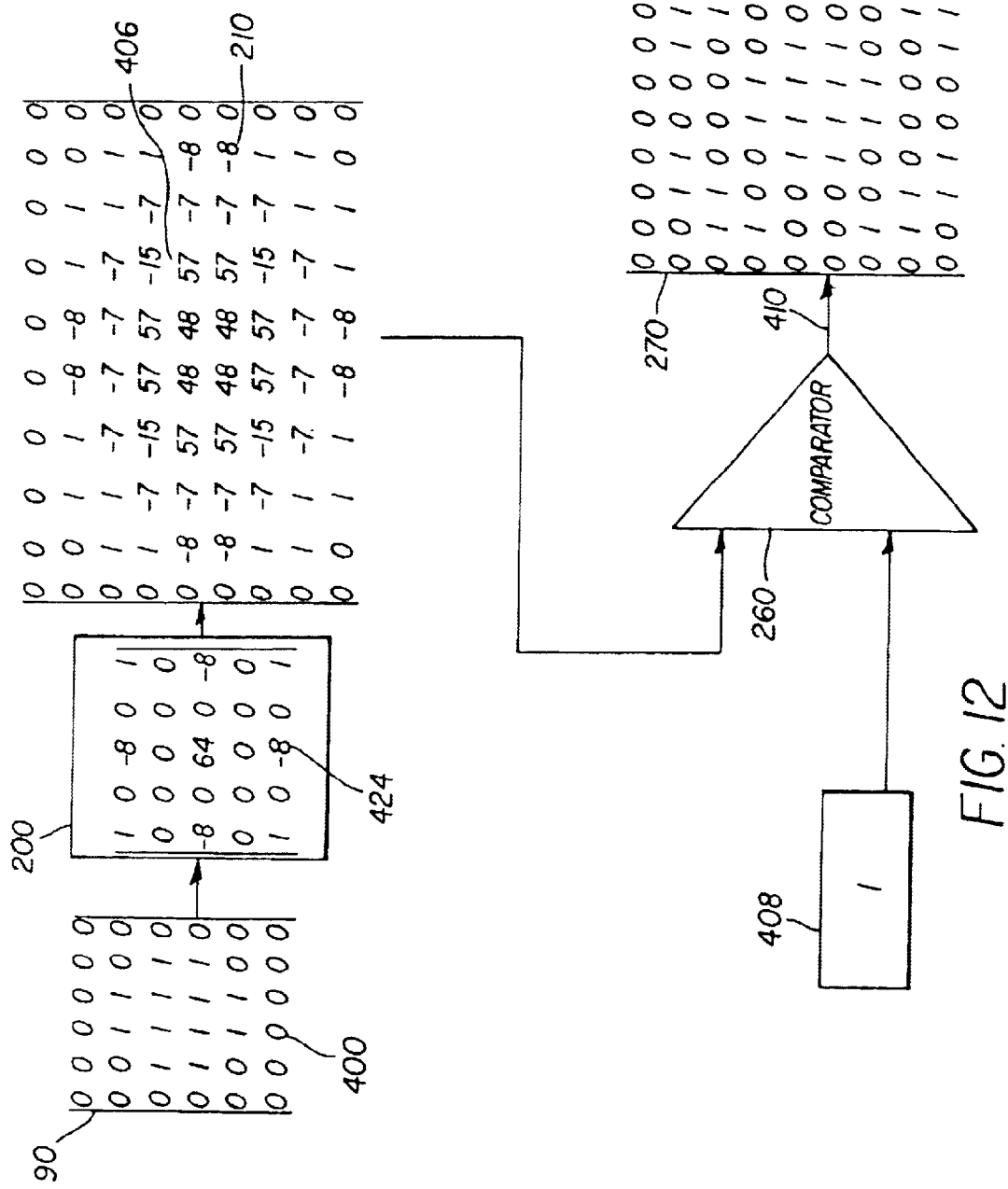
FIG. 12 is a block diagram showing the method of the present invention using a band pass filter.

Referring now to FIG. 8, the method for adjusting dot-gain for a halftone binary bitmap file is depicted using a digital filter, namely a low pass filter 414. A low pass filter will blur the image.

FIG. 8 shows that the first step involves inputting a halftone binary bitmap file 90 consisting of binary pixels 400 to a digital filter 200, shown here as a low pass blur filter 414. The filter may be implemented by passing each pixel through delay elements, multiplying each delayed position by the weight of the filter, and computing a weighted sum for each pixel location to produce a filtered image 210 composed of multi-level pixels 406.

Figure 17:
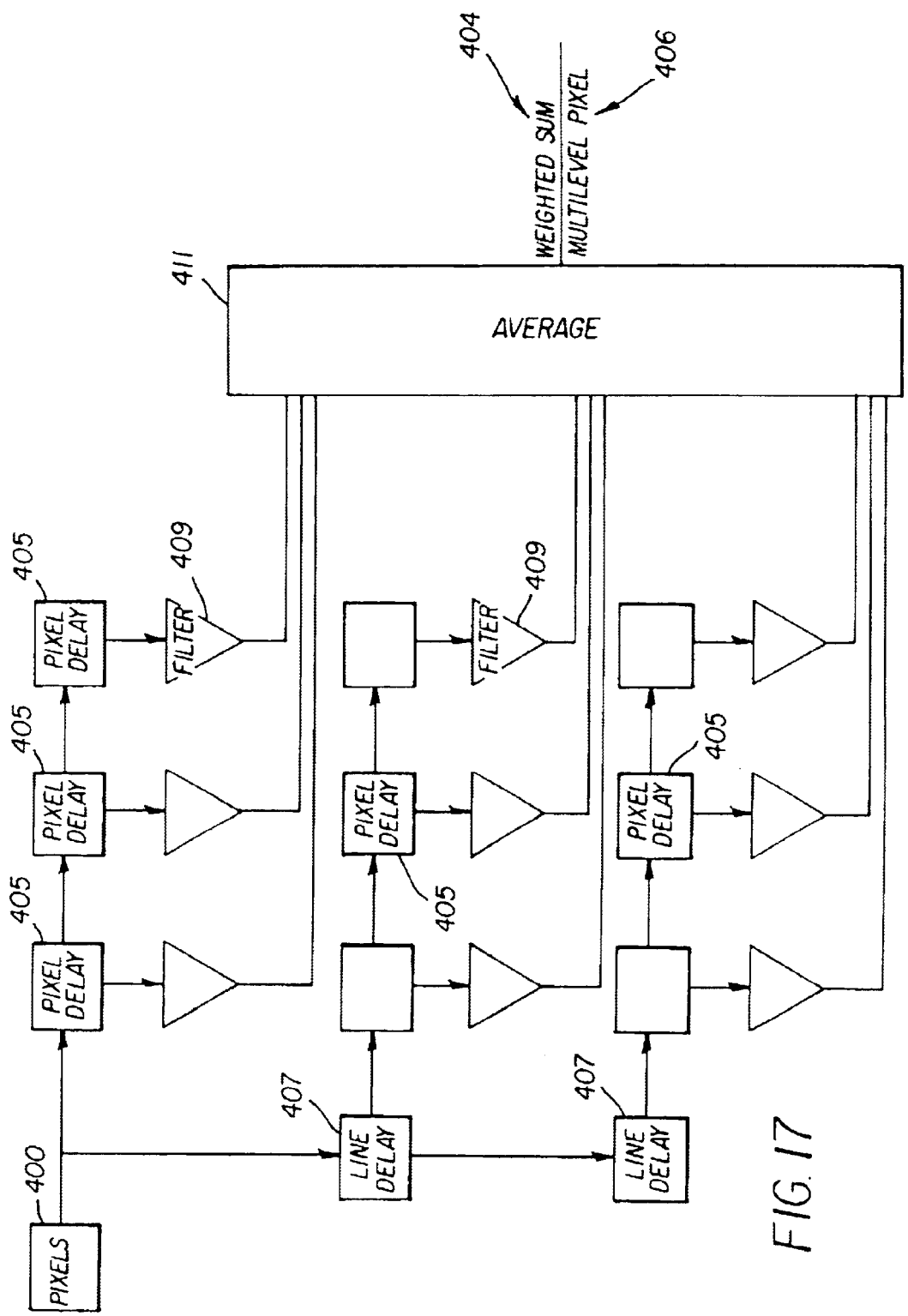
FIG. 17 shows a digital filter implementation consisting of line delays, pixel delays, filter gains, and a summation operation.

FIG. 17 shows an implementation of a 3×3 pixel filter. The input binary pixels are fed in one at a time 400 to pixel delay elements 405, and line delay elements 407. The output of each pixel delay element 405 is multiplied by the filter coefficient for that location 409. An averager 411 computes the weighted sum 404 of all the delayed pixels to create a multi-level pixel 406.

In FIG. 8 Each multilevel pixel 406 is compared to a preset level 408 using comparator 260 and a binary pixel output 410 is generated. The binary pixel outputs are collected to form an adjusted halftone binary bitmap file 270. In the example in FIG. 8 the preset level is set to eleven.

The digital filter 200 of the invention can be a low pass filter 414, an edge enhancement filter 416, an averager filter 418, a high pass filter 420, or a band pass filter 424. These filters 416 through 424 are shown in FIGS. 8, 9, 10, 11, and 12 respectively.

Figure 13:
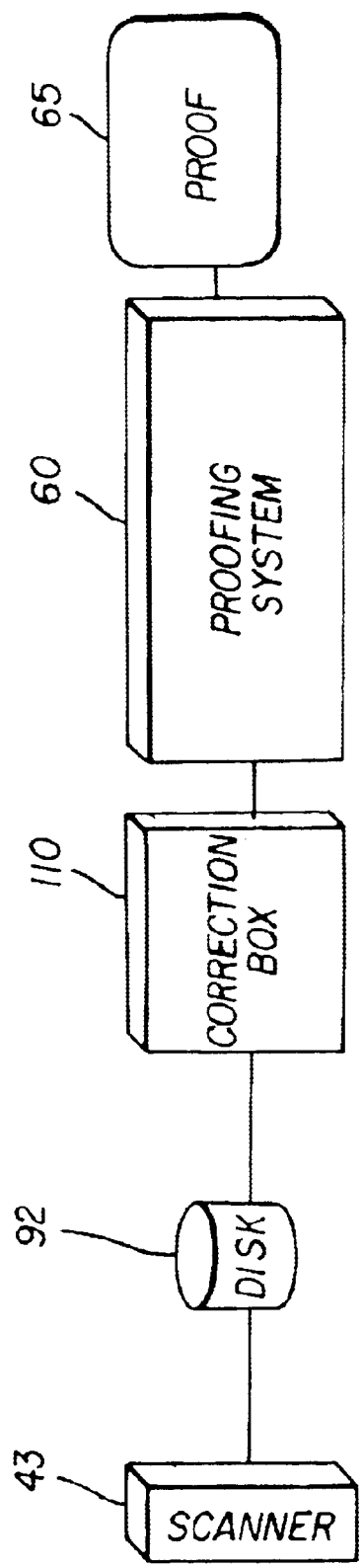
FIG. 13 is a block diagram showing a high resolution scanner as the binary bitmap source for making a proof with the invention.

The halftone binary bitmap file is in the most preferred embodiment generated by a raster image processor 40, shown in FIG. 2. Alternatively, the halftone binary bitmap file can be generated from a high resolution scan of a halftone film 43 shown in FIG. 13. FIG. 13 shows a halftone film 43 scanned to disk 92 at the writing resolution of the proofer. The scanned image is clipped using a threshold to create a binary bitmap at the writing resolution of the proofer 60. The image on disk is processed by our invention 110 on the way to proofer 60 creating adjusted print 65.

Figure 14:
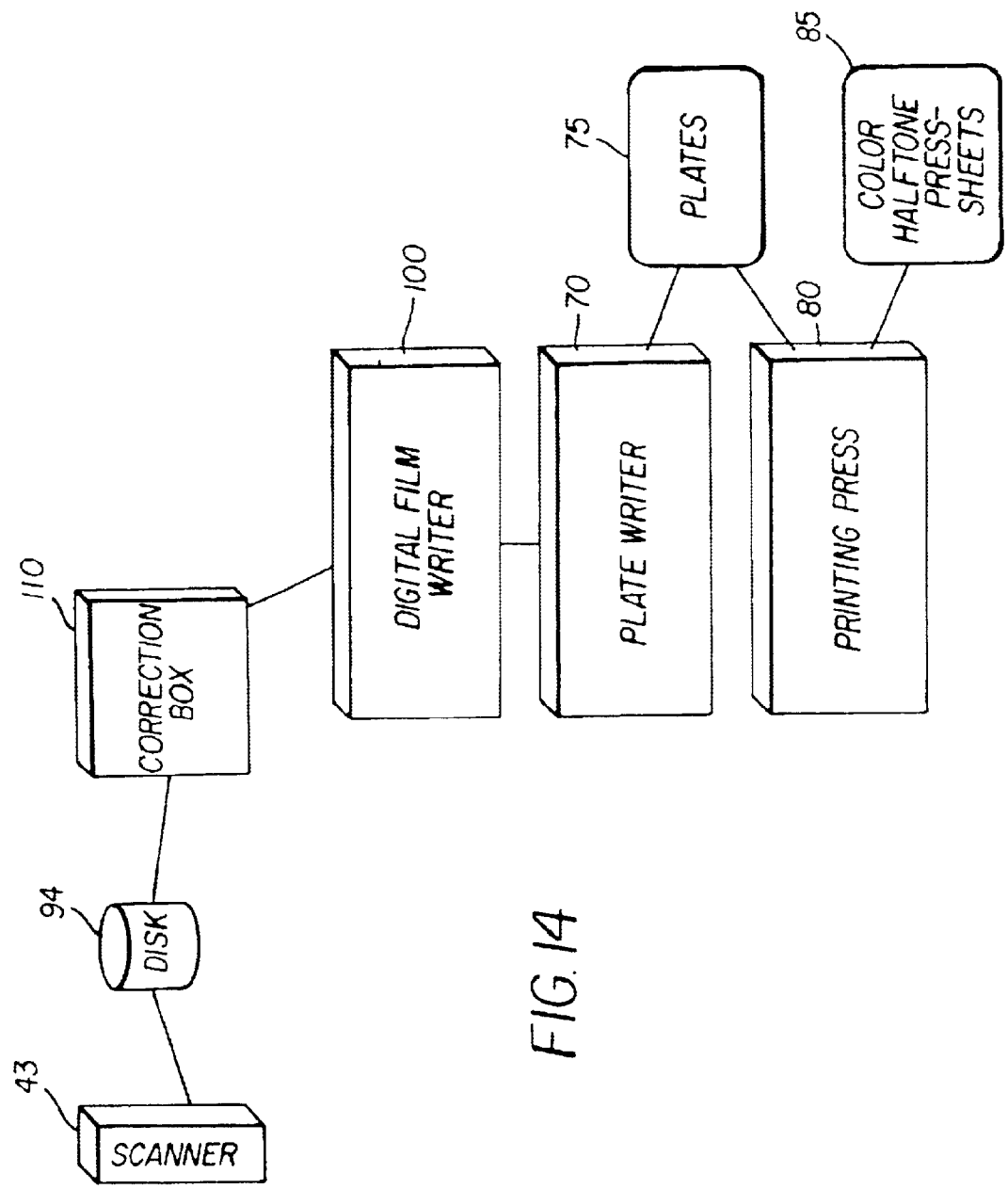
FIG. 14 is a block diagram showing a high resolution scanner as the binary bitmap source for making a plate with the invention.

The halftone binary bitmap file is in the most preferred embodiment generated by a raster image processor 30, shown in FIG. 7. Alternatively, the halftone binary bitmap file can be generated from a high resolution scan of a halftone film 43 shown in FIG. 14. FIG. 14 shows a halftone film 43 scanned to disk 94 at the writing resolution of the plate writer. The scanned image is clipped using a threshold to create a binary bitmap at the writing resolution of the plate writer 80. The image on disk is processed by our invention 10 on the way to plate writer 70 creating adjusted plate 75. Alternately a film writer 100 and plate processor maybe used to create plates 75. The dot-gain used in our invention 110 would be adjusted according to which method was used to create the printing plates.

The method contemplates that the halftone binary bitmap file is at a resolution of between 600 dpi and 6000 dpi, and more preferably at a resolution of between 1800 dpi and 3000 dpi.

The preset threshold level 408 mentioned above in this method can be determined by the color separation that the halftone binary bitmap file represents.

To use the method of the invention, the halftone binary bitmap file may be processed at a halftone binary bitmap screen ruling 426 and a halftone binary bitmap screen angle 428, or it can be determined by a halftone binary bitmap screen ruling alone, or by a halftone bitmap screen angle independently of the screen ruling.

FIG. 15 shows the method for adjusting dot-gain for a halftone binary print comprising the steps mentioned above, however, after the binary pixel output is collected and the adjusted halftone binary bitmap file is formed, the halftone binary bitmap file is then printed 65.

FIG. 16 shows a method for adjusting dot-gain for a printing plate comprising the steps noted in above plus the step of exposing a printing plate 85 to the adjusted halftone binary bitmap file after the adjusted halftone binary bitmap file is formed.

The invention has been described in detail with particular reference to certain preferred embodiments thereof, but it will be understood that variations and modifications can be effected within the scope of the invention.

Parts List

10. Prepress workstation
20. Disk with customer artwork
30. Raster image processor (RIP) for proofing
40. Raster image processor (RIP) for printing
43. High resolution film scanner
50. Proofing system disk
60. Proofing system
65. Digital halftone color proof
70. Plate writer
75. Plates
80. Printing press
85. Color halftone press-sheet
90. Plate writing system disk
100. Digital film writer
110. Dot-gain correction box for proofing
111. Dot-gain correction box for printing
200. Spatial filter
210. Blurred continuous tone image
250. Threshold value
260. Comparator
270. Dot-gain adjusted halftone bitmap
280. Off micro-pixel
290. On micro-pixel
300. Additional micro-pixel to add dot-gain
310. Deleted micro-pixel to subtract dot-gain
400. Binary pixels
404. Weighted sum
405. Pixel delay elements
406. Multilevel pixel
407. Line delay elements
408. Preset level
409. Filter coefficient
410. Binary pixel output
411. Averager 414. Low pass filter
416. Edge enhancement filter
418. Averager filter
420. High pass filter
424. Band pass filter
426. Screen ruling
428. Screen angle

What is claimed is:

1. A method for adjusting dot-gain for a halftone binary bitmap file comprising:
   a) inputting a halftone binary bitmap file consisting of binary pixels to a digital filter,
   b) filtering the binary pixels with the digital filter and generating a weighted sum of the pixels;
   c) producing a multilevel pixel from the weighted sum;
   d) comparing the multilevel pixel to a preset level and generating a binary pixel output; and
   e) collecting the binary pixel output and forming an adjusted halftone binary bitmap file.

2. The method of claim 1, wherein the digital filter is a blur filter, an edge enhancement filter, an averager filter, a high pass filter, a lower pass filter, or a band pass filter.

3. The method of claim 1, wherein the halftone binary bitmap file is generated by a raster image processor.

4. The method of claim 1, wherein the halftone binary bitmap file is generated from a high resolution scan of a halftone film.

5. The method of claim 1, wherein the halftone binary bitmap file is at a resolution of between 600 dpi and 6000 dpi.

6. The method of claim 5, wherein the halftone binary bitmap file is at a resolution of between 1800 dpi and 3000 dpi.

7. The method of claim 1, wherein the preset level is determined by the color separation that the halftone binary bitmap file represents.

8. The method of claim 1, wherein the halftone binary bitmap file will have been processed at a halftone binary bitmap screen ruling and a halftone binary bitmap screen angle.

9. The method of claim 1, wherein the preset level is determined by a halftone binary bitmap screen ruling.

10. The method of claim 1, wherein the preset level is determined by a halftone bitmap screen angle.

11. A method for adjusting dot-gain for a halftone binary print comprising the steps of:
   a) inputting a halftone binary bitmap file consisting of binary pixels to a digital filter;
   b) filtering the binary pixels with the digital filter and generating a weighted sum of the pixels;
   c) producing a multilevel pixel from the weighted sum;
   d) comparing the multilevel pixel to a preset level and generating a binary pixel output;
   e) collecting the binary pixel output and forming an adjusted halftone binary bitmap file; and
   f) printing the halftone binary bitmap file.

12. The method of claim 11, wherein the digital filter is a blur filter, an edge enhancement filter, an averager filter, a high pass filter, a lower pass filter, or a band pass filter.

13. The method of claim 11, wherein the halftone binary bitmap file is generated by a raster image processor.

14. The method of claim 11, wherein the halftone binary bitmap file is generated from a high resolution scan of a halftone film.

15. The method of claim 11, wherein the halftone binary bitmap file is at a resolution of between 600 dpi and 6000 dpi.

16. The method of claim 15, wherein the halftone binary bitmap file is at a resolution of between 1800 dpi and 3000 dpi.

17. The method of claim 11, wherein the preset level is determined by the color separation that the halftone binary bitmap file represents.

18. The method of claim 11, wherein the halftone binary bitmap file will have been processed at a halftone binary bitmap screen ruling and a halftone binary bitmap screen angle.

19. The method of claim 11, wherein the preset level is determined by a halftone binary bitmap screen ruling.

20. The method of claim 11, wherein the preset level is determined by a halftone bitmap screen angle.

21. A method for adjusting dot-gain for a printing plate comprising the steps of:
   a) inputting a halftone binary bitmap file consisting of binary pixels to a digital filter;
   b) filtering the binary pixels with the digital filter generating a weighted sum of the pixels;
   c) producing a multilevel pixel from the weighted sum;
   d) comparing the multilevel pixel to a preset level and generating a binary pixel output;
   e) collecting the binary pixel output and forming an adjusted halftone binary bitmap file; and
   f) exposing a printing plate to the adjusted halftone binary bitmap file.

22. The method of claim 21, wherein the digital filter is a blur filter, an edge enhancement filter, an averager filter, a high pass filter, a lower pass filter, or a band pass filter.

23. The method of claim 21, wherein the halftone binary bitmap file is generated by a raster image processor.

24. The method of claim 21, wherein the halftone binary bitmap file is generated from a high resolution scan of a halftone film.

25. The method of claim 21, wherein the halftone binary bitmap file is at a resolution of between 600 dpi and 6000 dpi.

26. The method of claim 25, wherein the halftone binary bitmap file is at a resolution of between 1800 dpi and 3000 dpi.

27. The method of claim 21, wherein the preset level is determined by the color separation that the halftone binary bitmap file represents.

28. The method of claim 21, wherein the halftone binary bitmap file will have been processed at a halftone bitmap screen ruling and a halftone binary bitmap screen angle.

29. The method of claim 21, wherein the preset level is determined by a halftone binary bitmap screen ruling.

30. The method of claim 21, wherein the preset level is determined by a halftone bitmap screen angle.

* * * * *